US011608063B2

(12) United States Patent
Jonasson et al.

(10) Patent No.: US 11,608,063 B2
(45) Date of Patent: Mar. 21, 2023

(54) VEHICLE SAFE STOP

(71) Applicant: Volvo Car Corporation, Gothenburg (SE)

(72) Inventors: Mats Jonasson, Partille (SE); Fredrik Broström, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 106 days.

(21) Appl. No.: 16/680,212

(22) Filed: Nov. 11, 2019

(65) Prior Publication Data

US 2020/0156640 A1 May 21, 2020

(30) Foreign Application Priority Data

Nov. 15, 2018 (EP) .................................... 18206480

(51) Int. Cl.
*B60W 30/18* (2012.01)
*B60W 10/04* (2006.01)
*B60W 50/00* (2006.01)

(52) U.S. Cl.
CPC ...... *B60W 30/18009* (2013.01); *B60W 10/04* (2013.01); *B60W 50/0097* (2013.01);
(Continued)

(58) Field of Classification Search
CPC .......... B60W 30/18009; B60W 10/04; B60W 50/0097; B60W 2520/105;
(Continued)

(56) References Cited

U.S. PATENT DOCUMENTS 5,934,399 A * 8/1999 Iiboshi ............... B60K 31/0008
180/169
9,452,754 B2 * 9/2016 Clarke ............... G06K 9/00798
(Continued)

FOREIGN PATENT DOCUMENTS

CA 2616613 A1 * 2/2007 .......... G05D 1/0274
DE 102017205245 A1 10/2018

OTHER PUBLICATIONS

European Search Report issued in European application No. 18206480.8 dated Jun. 5, 2019, 5 pp.
(Continued)

*Primary Examiner* — Jeff A Burke
*Assistant Examiner* — Kyle T Johnson
(74) *Attorney, Agent, or Firm* — Shumaker & Sieffert, P.A.

(57) ABSTRACT

A method for providing instructions for controlling vehicle, the method comprising: predicting a near-future driving path for the vehicle using sensor data received from environmental sensors of the vehicle. Retrieving at least one acceptable spatial deviation value indicative of the acceptable deviation from the predicted driving path. Determining a limit velocity value or a longitudinal deceleration value based on predetermined relations between spatial deviations from the near-future driving path and vehicle motion parameters and corresponding error values. The limit velocity value and the longitudinal deceleration value are determined with the constraint that the acceptable spatial deviation is not violated along the predicted driving path. Providing an instruction signal comprising an instruction for the vehicle to travel below the limit velocity value, or comprising an instruction to decelerate according to the longitudinal deceleration value in the event of a safe stop procedure.

17 Claims, 7 Drawing Sheets

(52) U.S. Cl.
CPC ............. *B60W 2520/105* (2013.01); *B60W 2520/125* (2013.01); *B60W 2720/106* (2013.01)

(58) Field of Classification Search
CPC ..... B60W 2520/125; B60W 2720/106; B60W 60/001; B60W 50/038; B60W 2720/10; B60W 30/181; B60W 30/143; B60K 28/10; B60Y 2302/05
See application file for complete search history.

(56) References Cited

U.S. PATENT DOCUMENTS

| | | | | |
|---|---|---|---|---|
| 9,523,984 | B1* | 12/2016 | Herbach | B60W 10/20 |
| 9,898,005 | B2* | 2/2018 | Mei | B60W 30/095 |
| 10,118,610 | B2* | 11/2018 | Deng | B60W 10/20 |
| 10,372,130 | B1* | 8/2019 | Kaushansky | B60W 60/001 |
| 10,479,371 | B1* | 11/2019 | Kim | B60W 40/08 |
| 2012/0215394 | A1* | 8/2012 | Wang | A01D 41/1278 701/50 |
| 2012/0277965 | A1* | 11/2012 | Takahashi | B60W 30/143 701/70 |
| 2016/0257309 | A1 | 9/2016 | Kumar et al. | |
| 2016/0318513 | A1 | 11/2016 | Lee | |
| 2017/0031361 | A1* | 2/2017 | Olson | G08G 1/167 |
| 2017/0057510 | A1* | 3/2017 | Herbach | B62D 15/0265 |
| 2017/0361848 | A1* | 12/2017 | Noto | B60W 50/0097 |
| 2018/0164823 | A1* | 6/2018 | She | G08G 1/165 |
| 2018/0229738 | A1* | 8/2018 | Nilsson | B60W 50/0205 |
| 2018/0267172 | A1* | 9/2018 | Oh | G01S 17/86 |
| 2019/0276016 | A1* | 9/2019 | Giorelli | B60W 30/10 |
| 2020/0082248 | A1* | 3/2020 | Villegas | G06N 3/0454 |
| 2020/0156640 | A1* | 5/2020 | Jonasson | B60K 28/10 |

OTHER PUBLICATIONS

Extended Search Report from counterpart European Application No. 21185087.0 dated Dec. 1, 2021, 10 pp.

* cited by examiner

VEHICLE SAFE STOP

CROSS REFERENCE

This application claims priority to European Application No. 18206480.8 filed Nov. 15, 2018, the entire contents of which are hereby incorporated by reference.

FIELD OF THE INVENTION

The present invention relates to a method for providing instructions for controlling vehicle. The present invention further relates to a system for controlling a vehicle.

BACKGROUND OF THE INVENTION

Today's vehicles are becoming increasingly advanced with regards to safety, both in terms of the structure of the vehicle and control functions for the vehicle. Most modern vehicles are equipped with advanced driver assist systems which aim to assist the driver in a driving process. One example of an advanced driver assist system is cruise control configured to maintain the speed of the vehicle.

More advanced adaptive cruise control systems are able to dynamically adapt the speed of the vehicle, for example slowing down for lead vehicles. Furthermore, some advanced driver assist systems may be configured for collision avoidance such as auto-braking the vehicle under some circumstances, or a steer assist to steer away from the object in the way of the vehicle if a collision is predicted.

In case of self-driving vehicles, it is desirable to not only calculate and follow a desired path, but also to have a back-up path to perform a so-called blind stop maneuver in case of system failure. US2018/0164823 describes an attempt to, in the event of vehicle failure, pilot the vehicle to stop within a driving acceptable region.

However, there is room for improvement with regards to ensuring a safe maneuver for the vehicle in the event of system failure.

SUMMARY

In view of above-mentioned prior art, it is an object of the present invention to provide a method which provides for a reduced risk of road departure or collision in the event of performing a safe stop procedure. Another object of the invention is to provide a corresponding system.

According to a first aspect of the invention, there is provided a method for providing instructions for controlling vehicle. The method comprises predicting a near-future driving path for the vehicle using sensor data received from environmental sensors of the vehicle. The method further comprises retrieving at least one acceptable spatial deviation value indicative of the acceptable deviation from the predicted near-future driving path.

Additionally, the method comprises determining a limit velocity value or a longitudinal deceleration value based on predetermined relations between spatial deviations from the near-future driving path and vehicle motion parameters and corresponding error values. The limit velocity value and the longitudinal deceleration value are determined with the constraint that the acceptable spatial deviation is not violated along the near-future driving path.

Moreover, providing an instruction signal comprising an instruction for the vehicle to travel below the limit velocity value, or providing an instruction signal comprising an instruction to decelerate according to the longitudinal deceleration value in the event of a safe stop procedure.

The present invention is based on the realization to provide instructions for preparing the vehicle control systems such that a safe stop procedure can be safely performed. This is ensured by either providing an instruction for the vehicle to not exceed the velocity value which was determined based on an acceptable spatial deviation from the predicted safe near-future driving path driving path and vehicle motion parameters including corresponding error values. Thus, if the velocity value is not exceeded during normal driving a safe stop is executable if necessary, without violating the acceptable spatial deviation during the safe stop.

Alternatively, in the event that a safe stop is to be executed, the vehicle control systems have received an instruction of the acceptable deceleration of the vehicle, determined based on the acceptable spatial deviation from a the predicted safe near-future driving path and vehicle motion parameters including corresponding error values. Thus, if a safe stop is to be executed the safe stop procedure is carried using the determined longitudinal deceleration value to ensure that the acceptable spatial deviation is not violated.

The inclusion of the error values in the vehicle motion parameters allows for taking into account an error in the present position and present motion of the vehicle. The errors translate into a calculated position intended for a possible safe stop. This type of error is often called a "dead-reckoning error". By including the error values in the calculation of the velocity and/or deceleration, it is possible to at least reduce the impact of the error values when performing a safe stop procedure. In other words, the risk of calculating a dangerous velocity or deceleration value that would cause road departure or a collision due to dead-reckoning error is reduced.

The predicted near-future path may either be a back-up path used only for a safe stop procedure if needed. The predicted near-future path may alternatively be the intended driving path for the vehicle regardless of a safe stop or not.

The near-future may be the immediate future, i.e. the next few seconds such as the next 2, 3, 4, 5, 6, 7, 8, 9, or 10 seconds.

Preferably, the acceptable spatial deviation is not violated at the end of the near-future driving path. The end of the near-future driving path may be at full stop of the vehicle in the event of a safe stop procedure is to be performed.

Accordingly, with the inventive concept, the vehicle control systems are prepared with instructions such that a safe stop can be performed in the event of system failure with reduced risk of road departure, or ego-lane departure or a collision with an object ahead taking into account error values in the vehicle motion parameters used for predicting the near-future driving path.

The vehicle motion parameters may comprise yaw rate, yaw angle, vehicle velocity, longitudinal deceleration, etc. The vehicle motion parameters may be considered initial or present vehicle motion parameters which are used for predicting a subsequent near-future driving path.

In one possible implementation, the method comprises to only provide the instruction signal comprising an instruction for the vehicle to travel below the velocity value. In such case, the method may comprise determining a limit velocity value based on predetermined relations between spatial deviations from a near-future driving path, and vehicle motion parameters including velocity values and error values. The limit velocity value is determined with the constraint that the acceptable spatial deviation is not violated along the near-future driving path.

An instruction signal is in this case provided comprising an instruction for the vehicle to travel below the velocity value. The instruction signal may be provided to a vehicle control system or another control unit controlling the steering and propulsion of the vehicle.

Accordingly, in this way the vehicle velocity may be controlled to stay below a threshold velocity such that a safe stop may be performed with an acceptable spatial deviation from a safe stop path or i.e. the predicted near-future path.

In one possible implementation, the method may comprise to only provide the instruction signal comprising an instruction to decelerate according to the longitudinal deceleration value in the event of a safe stop procedure. In other words, the method may comprise determining a longitudinal deceleration value based on predetermined relations between spatial deviations from the near-future driving path, vehicle motion parameters including velocity values and error values. The longitudinal deceleration value is determined with the constraint that the acceptable spatial deviation is not violated along the predicted near-future driving path.

An instruction signal is provided comprising an instruction for the vehicle to decelerate according to the deceleration value in the event of a safe stop procedure. The instruction signal may be provided to a vehicle control system controlling the steering and propulsion of the vehicle.

Accordingly, in this way the vehicle control systems receives knowledge of the deceleration which has to be used in order to stop the vehicle safely within the acceptable spatial deviation.

When determining a limit velocity value or a longitudinal deceleration value, the acceptable spatial deviation may be used as input. In other words, the method may comprise determining a limit velocity value or a longitudinal deceleration value based on predetermined relations between the acceptable spatial deviations, and the vehicle motion data including vehicle velocity values and the error values.

The vehicle velocity value may be a value that is maximized provided that the longitudinal deceleration value is not exceeded as well as the acceptable spatial deviations.

The method may comprise determining the error values for the vehicle motion parameters based on vehicle motion data received from vehicle motion sensors; calculating the limit velocity value based on maximizing a velocity parameter in the predetermined relations provided the acceptable spatial deviation value, an acceptable longitudinal deceleration value, and the error values. In this case, the error values may be the worst-case error values, i.e. the highest estimation of the error values.

The method may alternatively or additionally comprise calculating the longitudinal deceleration value based on minimizing deceleration parameter in the predetermined relations provided the acceptable spatial deviation values, a present velocity value, and the error values. In this case, the error values may be the worst-case error values, i.e. the highest estimation of the error values.

Accordingly, determining the limit velocity value or the longitudinal deceleration value may be based on formulating an optimization problem to be solved. As mentioned, the optimization problem may be to maximize the velocity value so that the longitudinal deceleration value is not exceeded as well as an acceptable lateral deviation and an acceptable longitudinal deviation comprised in the acceptable spatial deviation.

Given the error values, it is advantageously possible to calculate backwards to a safe state, i.e. within which speed interval a safe stop can be performed in order to not violate the acceptable spatial deviation. Alternatively, it is possible to calculate which longitudinal deceleration is required in order to ensure a safe stop which does not violate the acceptable spatial deviation.

Example vehicle motion data comprises velocity values, yaw rate values, and yaw angle values, although other vehicle motion data are also conceivable. These vehicle motion data may be directly or indirectly determined.

Correspondingly, example error values are an offset error value in the yaw rate value, an offset error value in the yaw angle value, and an error value in the vehicle velocity.

According to embodiments, determining the limit velocity value or a longitudinal deceleration value may comprise comparing a present velocity value or an acceptable longitudinal deceleration value to a dataset comprising relationships between velocity values and longitudinal deceleration values for each of a plurality of spatial deviations from an near-future driving path, the method further includes: retrieving at least one of a deceleration value or a velocity value from the dataset based on the comparison.

The dataset may thus advantageously comprise velocity values related to longitudinal deceleration values which are associated with being able to perform a safe stop within a given safe spatial deviation.

The acceptable spatial deviation is a spatial deviation from a predicted path which ensures that the vehicle does not depart the road or hit an object ahead of the vehicle when executing the predicted path.

The acceptable spatial deviation may comprise an acceptable lateral deviation. In such case, an acceptable spatial deviation is retrieved, wherein the method may comprise, in some embodiments, comparing present velocity value or an acceptable longitudinal deceleration value to a dataset comprising a relationship between velocity values and longitudinal deceleration values for each of a plurality of lateral deviations from a driving path.

The acceptable spatial deviation may comprise an acceptable longitudinal deviation. The acceptable longitudinal deviation ensures that the vehicle stops within an acceptable longitudinal margin from the predicted stopping point on the predicted path. In this way the vehicle is prevented from colliding with an object ahead of the vehicle. In this case the method may comprise retrieving an acceptable longitudinal deviation from the predicted driving path. The method may further comprise, in some embodiments, comparing present velocity value or an acceptable longitudinal deceleration value to a dataset comprising a relationship between velocity values and longitudinal deceleration values for each of a plurality of longitudinal deviations from a driving path.

In some embodiments, the acceptable spatial deviation may comprise an acceptable lateral deviation and an acceptable longitudinal deviation. In such case, the method may comprise retrieving an acceptable longitudinal deviation from the predicted driving path and an acceptable lateral deviation from the predicted driving path. The method further comprises comparing present velocity value or an acceptable longitudinal deceleration value to a dataset comprising a relationship between velocity values and longitudinal deceleration values for each of a plurality of longitudinal deviations from a driving path, and comparing present velocity value or an acceptable longitudinal deceleration value to a further dataset comprising a relationship between velocity values and longitudinal deceleration values for each of a plurality of lateral deviations from a driving path.

According to one embodiment, the predetermined dataset may be determined by the steps: determining error values in vehicle motion data received from vehicle sensors; calculating spatial deviations from the predicted near-future drive path for a plurality of velocity values and deceleration values based on the vehicle motion data and the respective error values; and generating the dataset comprising the relationships between velocity values and deceleration values for each of a plurality of spatial deviations.

The dataset may be predetermined prior to vehicle operation. In some embodiments, the dataset may be continuously updated during vehicle operation.

Updating the dataset may include calculating a new dataset based on present vehicle motion data. It may also comprise calculating a new data based on new error values.

According to a second aspect of the invention, there is provided a system for controlling a vehicle.

The system comprises a normal drive control unit configured to control propulsion and steering wheel angle during normal operation of the vehicle and to predict a near-future driving path for the vehicle based on sensor data acquired by a set of environmental sensors.

The system comprises a safe stop control unit configured to control a vehicle control system for the vehicle during a safe stop operation of the vehicle. The safe stop control unit is further configured to retrieve, an acceptable spatial deviation value indicative of the acceptable deviation from the predicted near future driving path.

The safe stop control unit is further configured to determine a limit velocity value or a longitudinal deceleration value based on predetermined relations between spatial deviations from the near-future driving path and vehicle motion parameters including corresponding error values, wherein the limit velocity value and the longitudinal deceleration value are determined with the constraint that the acceptable spatial deviation is not violated along the near-future driving path, The safe stop control unit is further configured to provide an instruction signal to the normal drive control unit comprising an instruction for the vehicle to travel below the velocity value, or provide an instruction signal to the vehicle control system comprising an instruction for the vehicle to decelerate according to the deceleration value in the event of a safe stop procedure.

The vehicle control system is preferably configured to control propulsion and steering of the vehicle, at least during a safe stop procedure.

In response to receiving the instruction signal the normal control unit may be configured to control the vehicle to travel at the a velocity not exceeding the velocity value, preferably at a velocity near or at the velocity value but subject to other constraints such as e.g. speed limits, road conditions, maximum lateral accelerations, etc.

The acceptable spatial deviation may be retrieve from a memory, i.e. it may be a pre-determined acceptable lateral deviation value. Alternatively, acceptable spatial deviation may be retrieved from the normal drive control unit.

The acceptable spatial deviation may comprise one or both of an acceptable lateral deviation and an acceptable longitudinal deviation.

According to embodiments, the normal drive control unit may be configured to provide a signal comprising the acceptable longitudinal deceleration value to the safe stop control unit. The normal drive unit which is responsible to controlling the vehicle under normal driving circumstances may provide its desired acceptable longitudinal deceleration value to the safe stop control unit which is may base on the presently analyzed data from the environmental sensors.

The environmental sensor may include LiDAR, Radar, ultrasound sensors, cameras, etc., configured to detect the near environment of the vehicle including nearby objects.

According to embodiments, the system may comprise a sensor monitoring unit configured to determine the error values in vehicle motion data received from vehicle sensors configured to measure vehicle motion data.

The safe stop control unit may be further configured to calculate spatial deviations from an expected drive path for a plurality of velocity values and deceleration values based on the vehicle motion data and the respective error values. The safe stop control unit may further be configured to generate a dataset comprising the relationships between velocity values and deceleration values for each of a plurality of spatial deviations.

According to embodiments, the dataset is continuously updated during vehicle operation. The sensor monitoring unit is configured to continuously to determine error values in vehicle motion data during vehicle operation, wherein the safe stop control unit is configured to continuously update the dataset.

The normal drive control unit may be disabled from controlling the propulsion, and braking, and steering of the vehicle during a safe stop operation of the vehicle.

According to embodiments, the safe stop control unit and the normal drive control unit may be isolated from each other. In this way, it may be ensured that the safe stop control unit may be operative even if the normal drive control unit fails.

Effects and features of the second aspect of the invention are largely analogous to those described above in connection with the first aspect of the invention.

According to a third aspect, there is provided a vehicle comprising the system according to any one of the embodiments of the second aspect.

The vehicle may be capable of driving in a self-driving mode. Furthermore, the vehicle may be a fully autonomous vehicle.

Effects and features of the third aspect of the invention are largely analogous to those described above in connection with the first aspect and the second aspect of the invention.

A control unit may include at least one microprocessor, microcontroller, programmable digital signal processor or another programmable device.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DETAILED DESCRIPTION

Figure 1:
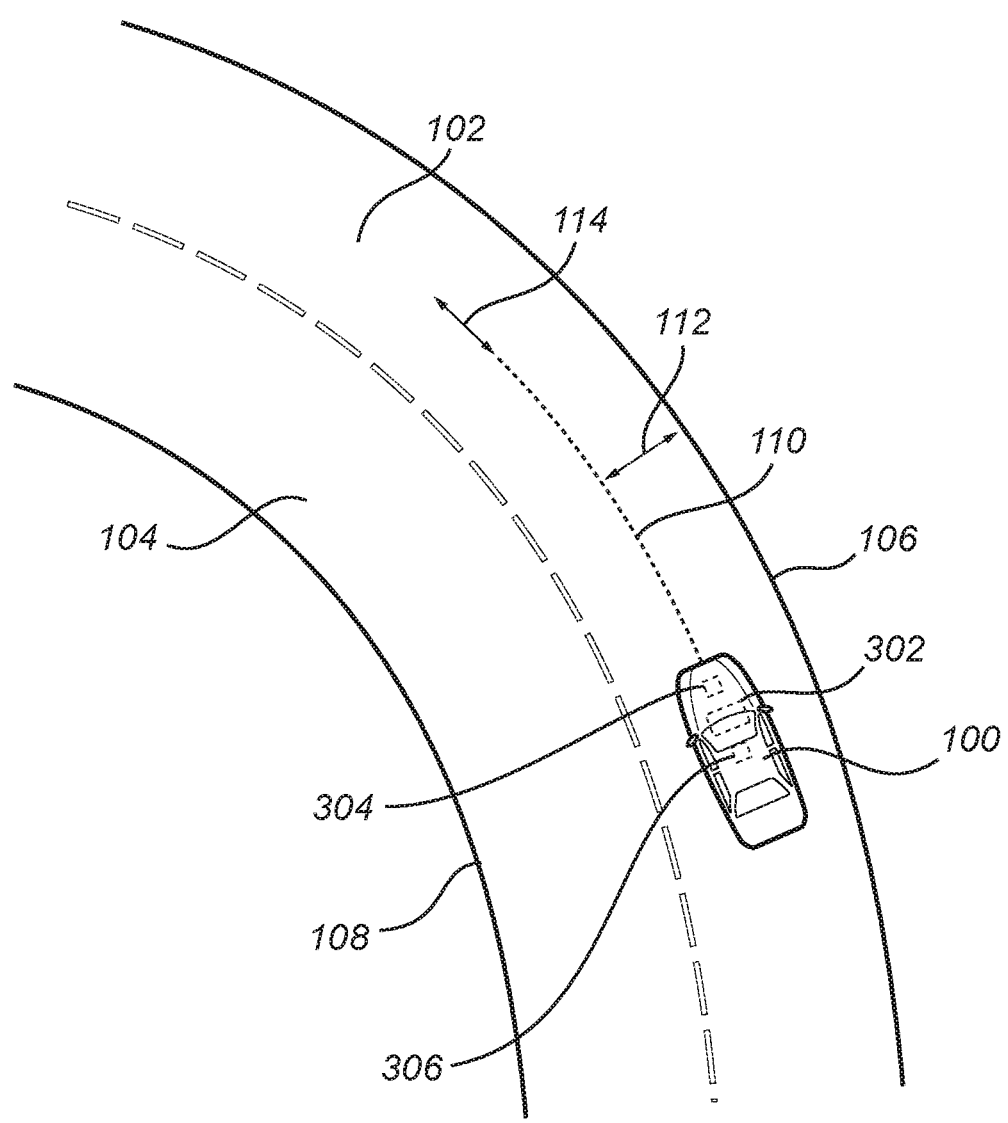
FIG. 1 illustrates a vehicle comprising a system according to embodiments.

In the present detailed description, various embodiments of the system and method according to the present invention are described. However, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 illustrates a vehicle 100 travelling on the road having a first lane 102 and a second lane 104 and delimited by outer edges 106 and 108. The vehicle comprises a normal drive control unit 302 configured to control the vehicle propulsion and steering wheel angle during normal operation of the vehicle 100.

The vehicle 100 further comprises a set of environmental sensors 304 configured to acquire sensor data and provide the sensor data to the normal drive control unit 302 for predicting a near-future driving path 110 for the vehicle 100. The driving path 110 may be continuously determined based on data received from the set of environmental sensors 304. Such sensors may comprise LiDAR, Radar, ultrasound sensors, cameras, etc., configured to detect the near environment of the vehicle 100, and any objects nearby the vehicle 100. Predicting the path 110 may be performed by means known per se and will not be discussed further herein.

In the event of a system failure it is desirable to be able to stop the vehicle safely within a predetermined lateral deviation and longitudinal deviation from the predicted path 110 in order to ensure a safe stop even if the normal drive control unit is not working properly. The lateral deviation and the longitudinal deviation may be at the end of the predicted near-future path 110, i.e. at full stop of the vehicle 110. A system failure may for example be that the normal drive control unit 302 malfunctions, a communication error in communication busses to or from the normal drive control unit, a power blackout in the normal drive control unit 302, or that the predicted paths determined by the normal drive control unit 302 are no longer valid, malfunctioning environmental sensors, etc., or any other malfunction which compromises the ability for the normal drive control unit to safely control the vehicle 100.

The vehicle 100 further comprises a safe stop control unit 306 configured to control a vehicle control system of the vehicle 100 during a safe stop operation of the vehicle. The vehicle control system is a system able to control the propulsion and steering of the vehicle 100.

The safe stop control unit 306 is configured to retrieve, from the normal drive control unit 302 or from an internal memory, an acceptable spatial deviation from the predicted path 110, in the form of an acceptable lateral deviation value indicative of the acceptable lateral deviation 112, or an acceptable longitudinal deviation value indicative of the acceptable longitudinal deviation 114, or both. In some embodiments, the normal drive control unit 302 may continuously provide acceptable lateral or longitudinal deviation values determined based on data received from the environmental sensor 304.

In order to be able to ensure that a safe stop may be performed, the safe stop control unit 306 is configured to determine a limit velocity value or a longitudinal deceleration value based on predetermined relations between spatial deviations from a predicted near-future driving path and vehicle motion parameters including corresponding error values. The limit velocity value and the longitudinal deceleration value are determined with the constraint that the acceptable spatial deviation is not violated.

Including the error values in the determination of the limit velocity value or a longitudinal deceleration value allows for handling dead-reckoning errors, i.e. errors in a present position or motion of the vehicle which may cause a dangerously final position of the vehicle. Including the error values allows for calculating the limit velocity value or a longitudinal deceleration value so that the final position at full stop is within safe spatial boundaries.

In other words, the velocity value and the longitudinal deceleration value are determined with the assumption that the acceptable spatial deviation is not to be exceeded and the determined velocity value and/or longitudinal deceleration is/are determined taking into account estimated or continuously determined error values for the vehicle motion parameters.

In some embodiments, a present velocity value or an acceptable longitudinal deceleration value are compared to a dataset comprising a relationship between velocity values and deceleration values for each of a plurality of spatial deviations from a driving path.

Using a dataset provides for a fast determination of the limit velocity value or longitudinal deceleration value which may be updated frequently, e.g. with the sampling frequency of the system including the normal drive control unit 302 and the safe stop control unit 306. The dataset may be provided in the form of a look-up table.

The dataset thus includes a set of relationships between velocity values and deceleration values, and each of the relationships corresponds to a given spatial deviation, i.e. either lateral deviation or a longitudinal deviation, or both. An example dataset will be further described below.

The safe stop control unit 306 is further configured to retrieve at least one of a deceleration value or a velocity value from the dataset based on the comparison.

Next, the safe stop control unit 306 is configured to provide an instruction signal to the normal drive control unit 302 comprising an instruction for the vehicle 100 to travel below the velocity value. Alternatively, the safe stop control unit 306 is configured to provide an instruction to the vehicle control system to decelerate according to the deceleration value in the event of a safe stop procedure.

The velocity value and/or the deceleration value are either determined from optimization of the relations between spatial deviations from an near-future driving path, velocity values and longitudinal deceleration values, or from the dataset comparison.

Accordingly, the safe stop control unit 306 may continuously instruct the normal drive control unit 302 to not exceed the velocity value such that, in the event of a system failure, the safe stop control unit is able to stop the vehicle within the desired lateral deviation 112 and/or longitudinal deviation 114 via the vehicle control system. In this way, the safe stop control unit 306 may continuously ensure that that the normal drive control unit does not violate the velocity value condition.

Furthermore, the safe stop control unit 306 may continuously provide an instruction which prepares the vehicle control system for the deceleration required for a safe stop within the lateral deviation 112 and/or the longitudinal deviation given the present vehicle velocity.

Accordingly, as the vehicle travels on the ego-lane 102 the safe stop control unit 306 provides instructions to the normal drive control unit 302 such that the velocity is limited to below a velocity value such that a safe stop may be executed without exceeding the lateral deviation 112 and/or the longitudinal deviation 114.

Further, the safe stop control unit 306 may provide an instruction signal such that the vehicle control system is provided instructions indicative of the declaration necessary for executing a safe stop without exceeding the lateral deviation 112 and/or the longitudinal deviation 114.

The normal control unit may attempt to control the vehicle velocity to be as close as possible to the determined velocity value without exceeding the velocity value.

Figure 2:
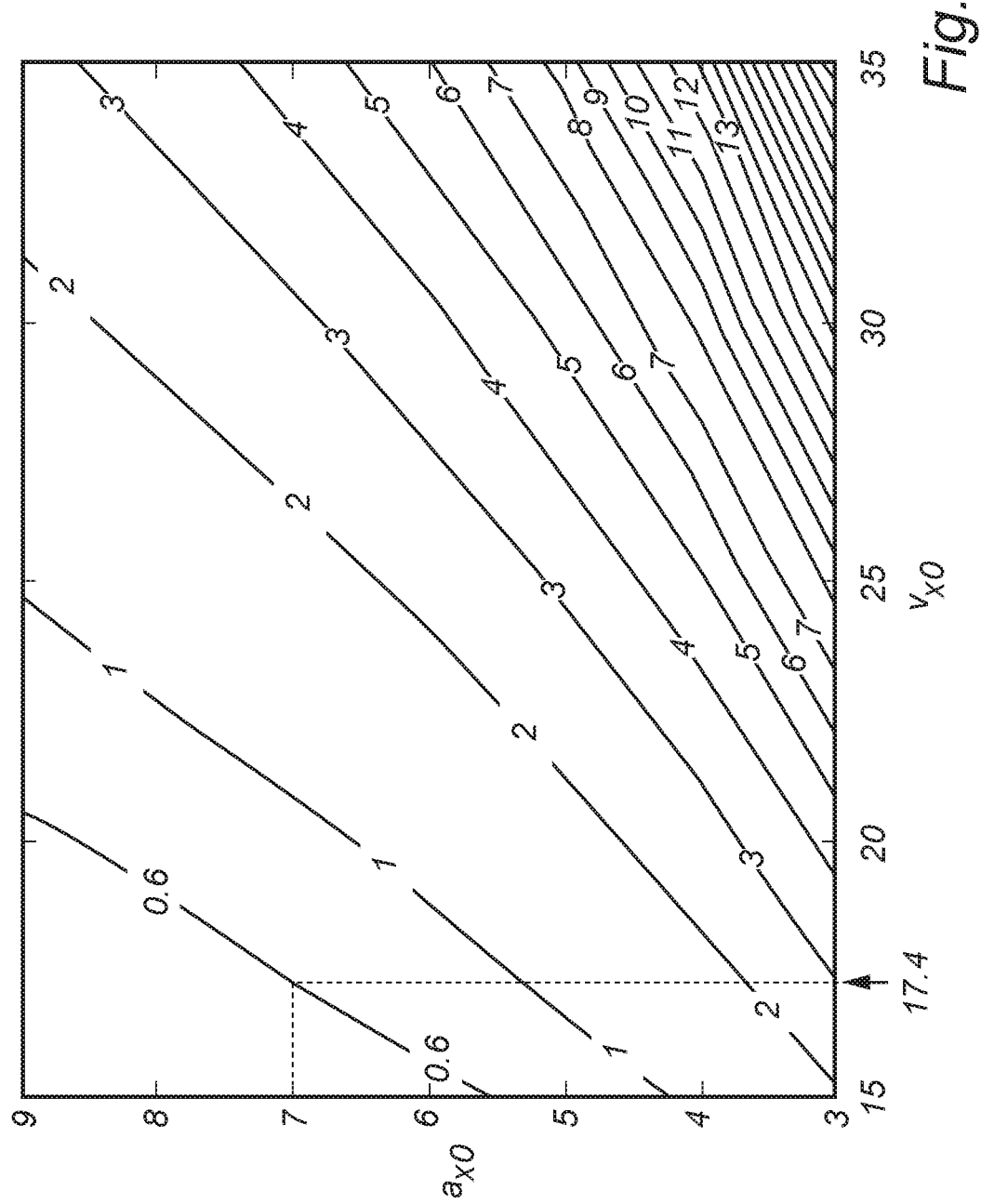
FIG. 2 is an example representation of a dataset.

FIG. 2 is a graphical representation of an example dataset. The dataset comprises the lateral deviations at full stop for different initial vehicle velocities $V_{x0}$ and different deceleration values $\alpha_{x0}$. Each of the lines indicated in FIG. 2 has an indicated lateral deviation, e.g. 0.6, 1, 2, 3, 4, etc. The vehicle velocities $V_{x0}$ and different deceleration values $a_{x0}$ on the line for a given lateral deviation should be fulfilled in order to ensure that the respective lateral deviation is not exceeded. Preferably, the relationships between vehicle velocities $V_{x0}$ and different deceleration values $a_{x0}$ for small lateral deviations are used, such as lateral deviations of 1 m or 0.6 m.

Accordingly, assuming that the lateral deviation of 0.6 m is acceptable, and an acceptable deceleration value is 7 m/s$^2$, then the normal drive control unit is instructed to travel at a velocity not exceeding 17.4 m/s.

Similarly, assuming that the lateral deviation of 0.6 m is acceptable, and the vehicle is travelling at the velocity 17.4 m/s, then an acceptable deceleration value is 7 m/s$^2$ to be used in case of a safe stop procedure.

In case of using a optimization approach, it may be possible to estimate the maximum possible error values that each vehicle motion sensor has and that contributes to the total spatial deviation during dead-reckoning. These estimates may be estimated online, the safe stop control unit 306 may at any point in time determine a maximum velocity based on the accuracy of the estimates of sensor error values. An optimization problem definition may be stated as to find the maximum velocity which satisfies the constraints given by the minimum and maximum sensor error values as well as any other constraints such as a maximum longitudinal deceleration, maximum lateral acceleration, maximum lateral or longitudinal spatial errors or any dependent scenarios from the mentioned limits, such as yaw rate which would be limited by a maximum lateral acceleration at a given velocity. The problem can be described as to maximize vehicle velocity ($v_x$) subject to $g_i \leq 0$, i=1, . . . , m, where $v_x$ is the longitudinal velocity and the variable to be maximized, and $g_i$ are the inequality constraints construed upon the optimization problem from the m constraints limiting the possible velocity.

Figure 3:
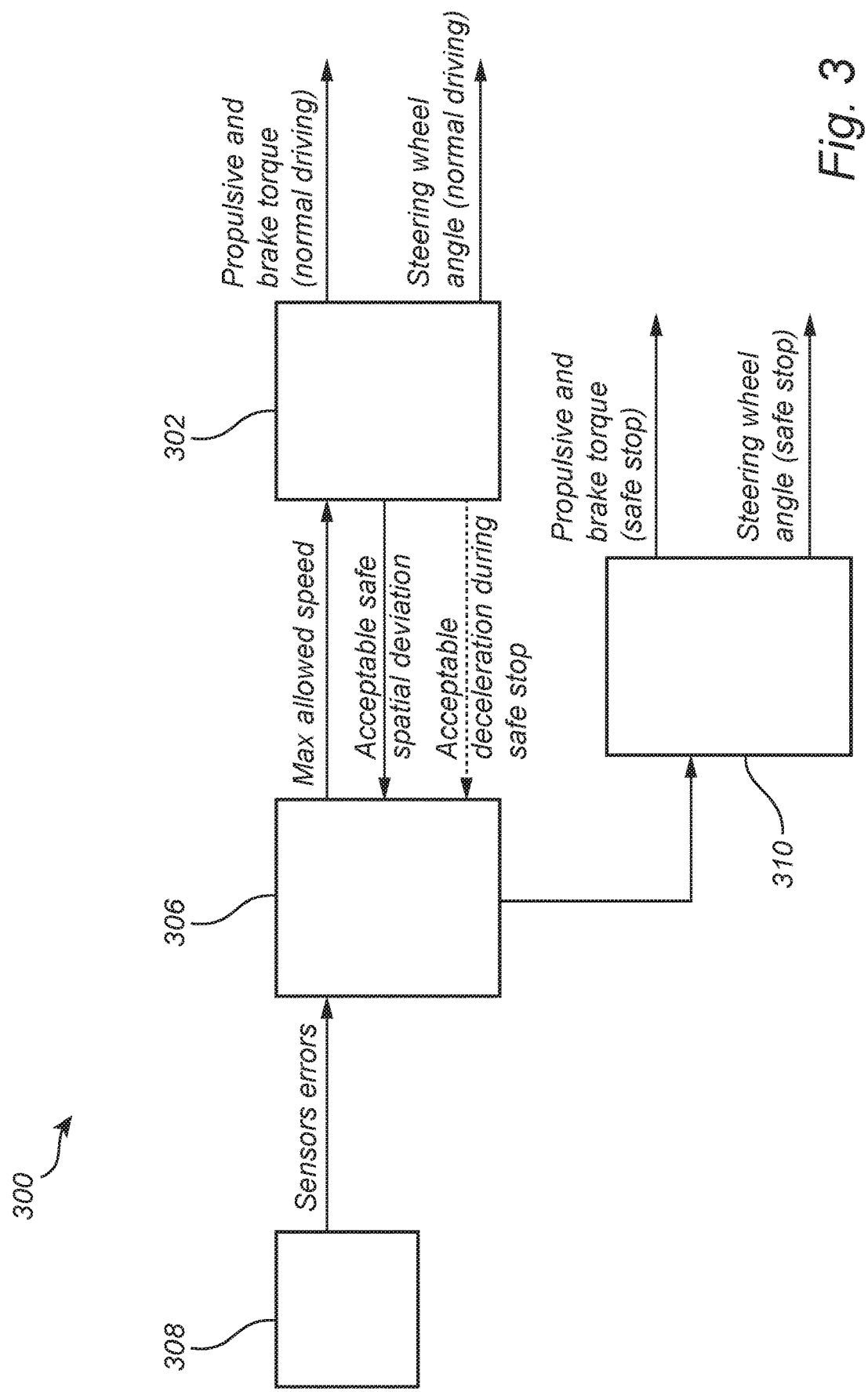
FIG. 3 illustrates a box-diagram of a system according to embodiments.

FIG. 3 is a box diagram of a system 300 according to embodiments. The system 300 comprises a normal drive control unit 302 configured to control propulsion and steering wheel angle during normal operation of the vehicle and to predict a driving path for the vehicle based on sensor data acquired by a set of environmental sensors (not shown).

Furthermore, the system 300 comprises a safe stop control unit 306 configured to control a vehicle control system 310 for the vehicle during a safe stop operation of the vehicle. The safe stop control unit 306 may be configured to receive, from the normal drive control unit 302, an acceptable spatial deviation from the predicted near-future driving path. Alternatively, the safe stop control unit 306 has a predetermined acceptable spatial deviation stored in a memory. In such case the safe stop control unit 306 does not have to receive the acceptable spatial deviation from the normal control unit 302. As mentioned above, the acceptable spatial deviation may be an acceptable lateral deviation, acceptable longitudinal deviation, or both an acceptable lateral deviation and an acceptable longitudinal deviation.

The safe stop control unit 306 is configured to determine a limit velocity value or a longitudinal deceleration value based on predetermined relations between spatial deviations from a predicted near-future driving path and vehicle motion parameters including corresponding error values. The limit velocity value and the longitudinal deceleration value are determined with the constraint that the acceptable spatial deviation is not violated along the predicted near-future driving path.

In some embodiments, the safe stop control unit 306 is configured to compare a present velocity value or an acceptable longitudinal deceleration value to a dataset comprising a relationship between velocity values and deceleration values for each of a plurality of spatial deviations from a driving path.

In case of comparing the acceptable longitudinal deceleration value to the dataset, the acceptable longitudinal deceleration may advantageously be provided by the normal drive control unit 302.

The safe stop control unit 306 is configured to provide an instruction to the normal drive control unit to not travel at a velocity exceeding a retrieved velocity value, i.e. a max allowed speed, from the dataset based on the comparison.

The safe stop control unit 306 may further be configured to provide an instruction to the vehicle control system 310 to decelerate according to a deceleration value retrieved from the comparison, in the event of a safe stop procedure.

In some embodiments, the system comprises a sensor monitoring unit 308 configured to determine error values in vehicle motion data received from received from vehicle sensors (not shown) configured to measure vehicle motion data. Such sensors may for example comprise an inertial measurement unit, wheel speed sensors, etc.

The safe stop control unit 306 further is configured to calculate spatial deviations from the predicted near-future path for a plurality of velocity values and deceleration values based on the vehicle motion data and the respective error values. The safe stop control unit 306 is then configured to generate a dataset comprising the relationships between velocity values and deceleration values for each of a plurality of spatial deviations. This procedure of generating the dataset from the error values may be performed off-line, prior to vehicle operation. In this case, the dataset is updated with the present vehicle motion data. Alternatively or additionally, the generation of the dataset may be performed online, while the vehicle is operative. In this way may the dataset be updated online by new error values and vehicle motion data.

For exemplary purposes it will now be described how the relations between spatial deviations from a near-future driving path, and vehicle motion parameters in the form of velocity values longitudinal deceleration values, and yaw rate may be derived. This is a simplified derivation shown for exemplifying purposes only and should not be construed as limiting the scope of the appended claims. In some possible implementations, optimization processes known per se are required for obtaining the velocity value or deceleration value.

Based on sensors in the vehicle, i.e. such as sensors comprised in an inertial measurement unit, a vehicle control unit such as the safe stop control unit 306 is able to determine an initial yaw angle value. The initial yaw angle value may be considered the most recent measure of the yaw angle. The yaw angle is the angle between the vehicle heading and the velocity direction of the vehicle.

The initial yaw angle has an error ($o_\chi$), thus the initial yaw angle ($\hat{\psi}_0$) may be given by:

$$\hat{\psi}_0 = \psi_0 + o_\psi,$$

where $\psi_0$ is the true initial yaw angle and $o_\psi$ is an offset error.

The vehicle velocity measurement is also subject to errors. Often is the longitudinal vehicle velocity measured by vehicle wheel speed sensors, and such sensors are sensitive to errors in tire radius and longitudinal slip. This often leads to a gain error, whereby the vehicle velocity may be given by:

$$\hat{v}_x(t) = g_v v_x(t),$$

where $v_x(t)$ is the true vehicle velocity.

Another possible vehicle motion data is the yaw rate of the vehicle. A gyroscope in an inertia measurement unit may form the basis for the yaw rate measurement. A gyroscope is sensitive for offsets error from the sensor itself combined with uncorrected contamination from gravity. Consequently these uncertainties may be lumped in an offset error ($o_\omega$). The measurement of yaw rate may then expressed:

$$\hat{\omega}_z(t) = \omega_z(t) + o_\omega,$$

where $\omega_z(t)$ is the true yaw rate.

The position of the vehicle at time $t = t_f$ is given by $$X(t_f) = X_0 + \int_0^{t_f} v_x(t) dt, \text{ and}$$

$$Y(t_f) = Y_0 + \int_0^{t_f} v_x(t)(\psi_0 + \int_0^{t_f} \omega_z(t) dt)$$

For a safe stop maneuver, it may for simplicity be assumed that the initial positions $X_0 = 0$, $Y_0 = 0$, and $\psi_0 = 0$. With a constant deceleration $\alpha_{x0}$, the velocity of the vehicle is $$v_x(t) = v_{x0} - \alpha_{x0} t.$$

The vehicle may further be assumed to be controlled to follow a constant yaw rate, i.e. $\omega_z(t) = \omega_{z0}$.

The observed position of the vehicle (i.e. with the errors included) is then:

$$\hat{X}(t_f) = \int_0^{t_f} g_v(v_{x0} - \alpha_{x0} t) dt = g_v\left(v_{x0} t_f - \frac{1}{2} a_{x0} t_f^2\right), \text{ and}$$

$$\hat{Y}(t_f) = \int_0^{t_f} g_v(v_{x0} - \alpha_{x0} t)\left(o_\psi + \int_0^{t_f} (\omega_{z0} + o_w) dt\right) =$$

$$g_v\left(v_{x0} o_\psi t_f + \frac{1}{2}(v_{x0}(\omega_{z0} + o_w) - a_{x0} o_\psi) t_f^2 - \frac{1}{3} a_{x0}(\omega_{z0} + o_w) t_f^3\right)$$

The vehicle stands still at time $t_f = v_{x0}/\alpha_{x0}$, which results in:

$$\hat{X}(t_f) = \frac{1}{2} g_v \frac{v_{x0}^2}{a_{xo}},$$

-continued $$\hat{Y}(t_f) = g_v\left(\frac{1}{2} \frac{o_\psi v_{x0}^2}{a_{xo}} + \frac{1}{6} \frac{(\omega_{z0} + o_w) v_{x0}^3}{a_{xo}^2}\right).$$

A position error, may then be provided as:

$$e_x = \hat{X}(t_f) - X(t_f) = (g_v - 1)\frac{1}{2}\frac{v_{x0}^2}{a_{xo}}, \text{ and}$$

$$e_y = \hat{Y}(t_f) - y(t_f) = g_v\left(\frac{1}{2}\frac{o_\psi v_{x0}^2}{a_{xo}} + \frac{1}{6}\frac{o_w v_{x0}^3}{a_{x0}^2}\right) + \omega_{z0}(g_v - 1)\frac{1}{6}\frac{v_{x0}^3}{a_{x0}^2}$$

Here, in this example simplified derivation $e_y$ represents the lateral deviation and $e_x$ a longitudinal deviation. Accordingly, from $e_y$ it is possible to realize that in order to minimize the lateral deviation in the event of a vehicle safe stop maneuver, the vehicle velocity ($v_{x0}$) should be kept low and that the deceleration ($\alpha_{x0}$) should be high. Note also that the gain error in vehicle speed influences the lateral position error, i.e. the lateral deviation in the dataset. It can further be noted that provided that the velocity gain error $g_v$ is known (either predetermined or estimated online) and an acceptable longitudinal deviation is given, it is possible to determine the maximum velocity value $v_{x0}$ relative the deceleration ($\alpha_{x0}$). Given the acceptable deceleration ($\alpha_{x0}$) it become possible to determine the maximum velocity value $v_{x0}$.

In the dataset comprising a relationship between velocity values and longitudinal deceleration values for each of a plurality of lateral deviations from a driving path, the lateral deviations are represented by the above derived lateral position error $e_y$. This lateral deviation is selected based on the acceptable lateral deviation. For example, it may be predetermined that the acceptable lateral deviation is 0.6 m. Based on setting $e_y = 0.6$, it is then possible to determine relation between the vehicle velocity and the acceleration. This may be done for several acceptable lateral deviations in order to form a dataset as represented in FIG. 2.

From the above it is noted that two sub-datasets may be used in some possible implementations, one for the lateral deviation and one for the longitudinal deviation.

The sensor errors ($g_v$, $o_w$, $o_\psi$) are provided by the sensor monitoring unit 308. The sensor errors are preferably found from estimations performed prior to vehicle operation. The estimation may be obtained from calibration steps of the sensors measured prior to vehicle operations. E.g., the sensor errors may be empirically determined. During vehicle operation the sensor errors are constants.

Alternatively, the sensor errors may be continuously updated during vehicle operation. In this way is may be possible to determine e.g. an upper limit for the vehicle velocity given an acceptable longitudinal deceleration value and acceptable longitudinal and lateral deviations, using optimization techniques.

Furthermore, the dataset may be continuously updated with the most recent yaw rate of the vehicle.

Figure 4:
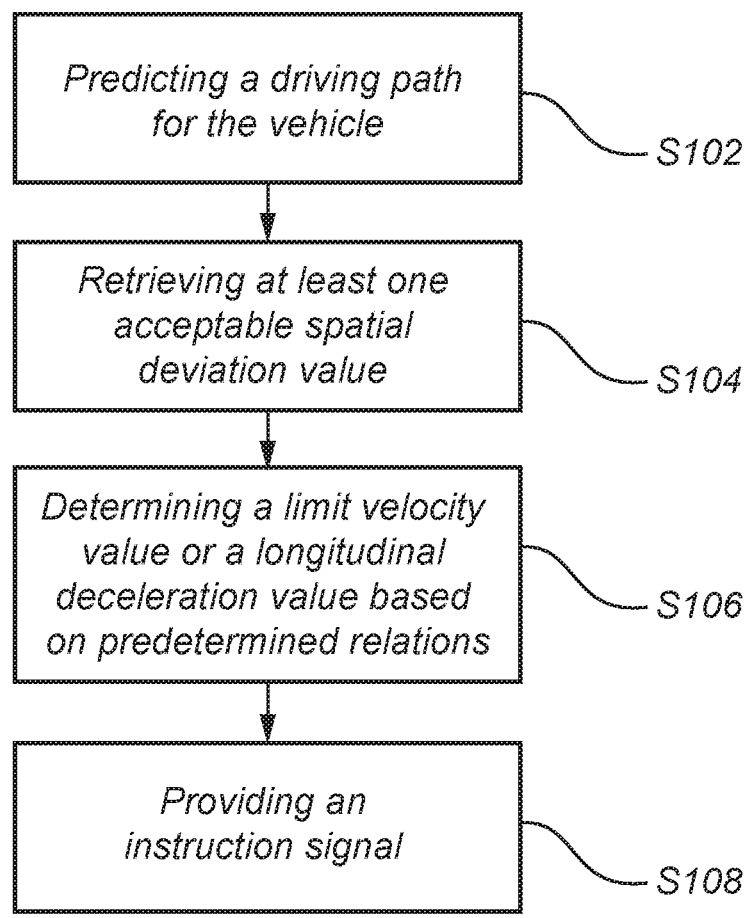
FIG. 4 is a flow-chart of method steps according to embodiments.

FIG. 4 is a flow-chart of method steps according to example embodiments. Step S102 comprises predicting a near-future driving path for the vehicle using sensor data received from environmental sensors of the vehicle. Step S104 comprises retrieving at least one acceptable spatial deviation value indicative of the acceptable deviation from the predicted near-future driving path. Subsequently in step S106, determining a limit velocity value or a longitudinal deceleration value based on predetermined relations between spatial deviations from an near-future driving path and vehicle motion parameters including corresponding error values. The limit velocity value and the longitudinal deceleration value are determined with the constraint that the acceptable spatial deviation is not violated, Next, in step S108 providing an instruction signal comprising an instruction for the vehicle to travel below the limit velocity value, or an instruction to decelerate according to the longitudinal deceleration value in the event of a safe stop procedure.

Figure 5:
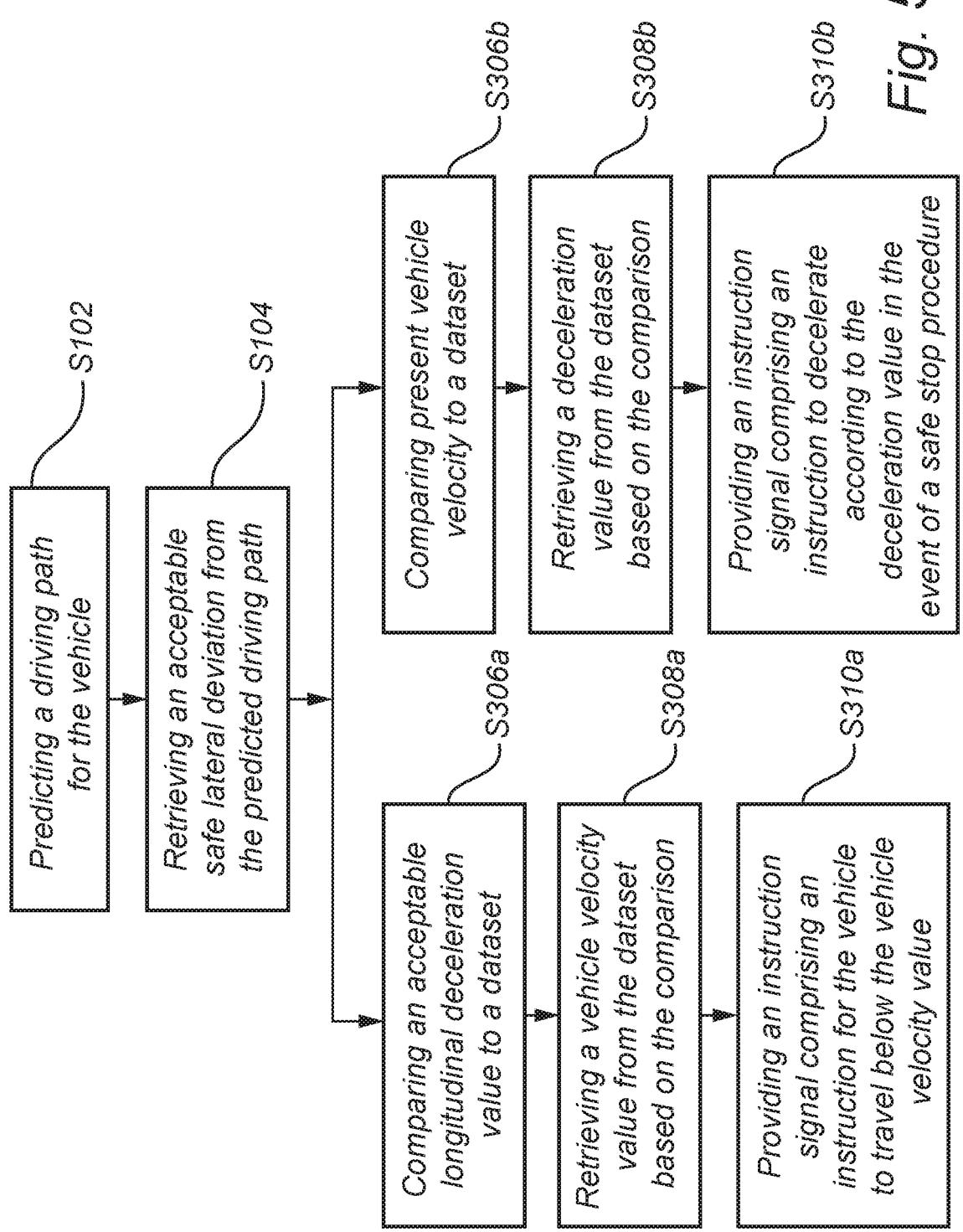
FIG. 5 is a flow-chart of method steps according to embodiments.

FIG. 5 illustrates method steps according to further embodiments. The method may here follow at least one of two lines of method steps, of which the first one is next followed.

Step S306a comprises comparing an acceptable longitudinal deceleration value to a dataset comprising a relationship between velocity values and longitudinal deceleration values for each of a plurality of spatial deviations from the predicted near-future driving path. Next, retrieve a velocity value from the dataset based on the comparison in step S308a. In subsequent step S310a providing an instruction signal comprising an instruction for the vehicle to travel below the velocity value.

The other line of method steps comprises a step S306b of comparing a present velocity value to a dataset comprising a relationship between velocity values and longitudinal deceleration values for each of a plurality of lateral deviations from the predicted near-future driving path. Next S308b, retrieve a deceleration value from the dataset based on the comparison in step S306b. Subsequently S310b, providing an instruction signal comprising an instruction to decelerate according to the deceleration value in the event of a safe stop procedure.

Figure 6:
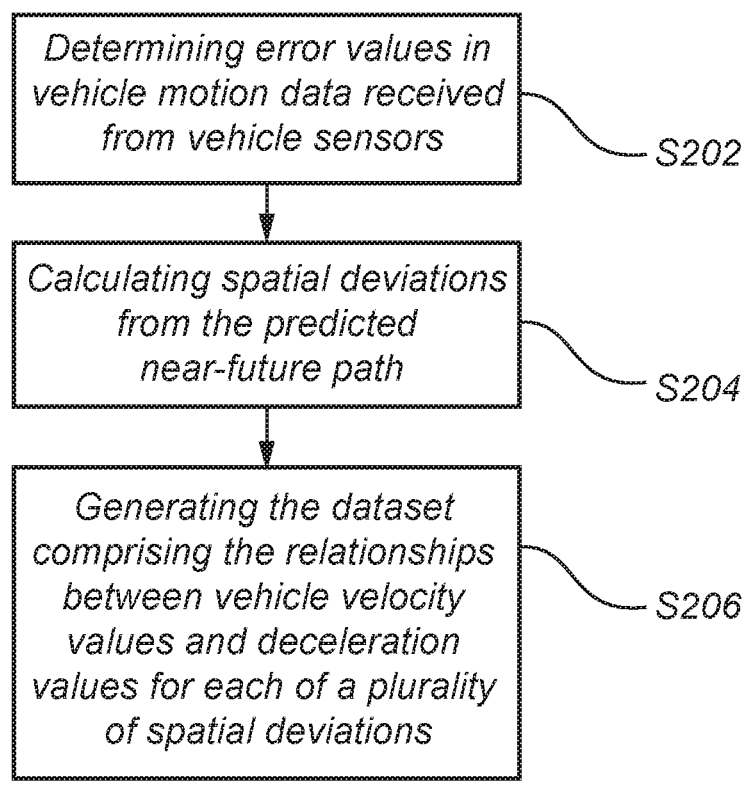
FIG. 6 is a flow-chart of method steps according to embodiments.

FIG. 6 is a flow-chart of method steps according to example embodiments. In step S202, determining error values in vehicle motion data received from vehicle sensors. The vehicle sensors may comprise an inertial measurement unit and wheel speed sensors. Subsequently, calculating spatial deviations from an expected drive path for a plurality of velocity values and deceleration values based on the vehicle motion data and the respective error values in step S204. In step S206 is the dataset generated and comprises the relationships between velocity values and deceleration values for each of a plurality of spatial deviations.

Figure 7:
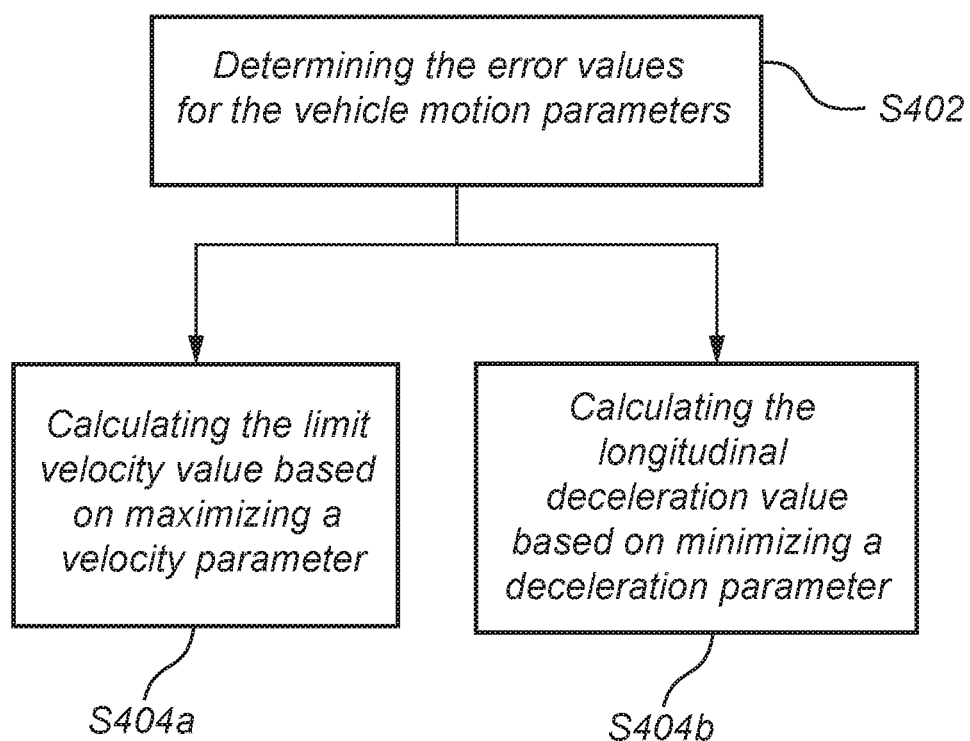
FIG. 7 is a flow-chart of method steps according to embodiments.

FIG. 7 illustrates a further flow-chart of method steps according to embodiments. In step S402 determining the error values for the vehicle motion parameters based on vehicle motion data received from vehicle motion sensors. Calculating S404a the limit velocity value based on maximizing a velocity parameter in the predetermined relations provided the acceptable spatial deviation value, an acceptable longitudinal deceleration value, and the error values. Alternatively, calculating S404b the longitudinal deceleration value based on minimizing a deceleration parameter in the predetermined relations provided the acceptable spatial deviation values, a present velocity value, and the error values.

A vehicle in accordance with the invention may be any vehicle operative on a road, such as a car, a truck, a lorry, a bus, etc.

The control unit may include a microprocessor, microcontroller, programmable digital signal processor or another programmable device. The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A method for providing instructions for controlling a vehicle, the method comprising:
   predicting a near-future driving path for the vehicle using sensor data received from environmental sensors of the vehicle;
   calculating, based on error values for vehicle motion parameters, including error values for a plurality of velocity values or longitudinal deceleration values, a plurality of spatial deviations from the near-future driving path, the plurality of spatial deviations including a plurality of lateral position deviations and a plurality of longitudinal position deviations, wherein the error values are based on sensor errors of vehicle sensors that measure the vehicle motion parameters and wherein the error values take into account one or more predetermined offsets in the vehicle sensors translated into the predicted near-future driving path to determine the plurality of lateral position deviations and longitudinal position deviations of the vehicle in an event of a safe stop procedure;

retrieving at least one acceptable spatial deviation from the plurality of spatial deviations indicative of an acceptable deviation from the predicted near-future driving path;

determining a limit velocity value or an acceptable longitudinal deceleration value based on the at least one acceptable spatial deviation, wherein the limit velocity value and the acceptable longitudinal deceleration value are determined such that the at least one acceptable spatial deviation is not violated along the predicted near-future driving path; and providing an instruction signal comprising an instruction for the vehicle to travel below the limit velocity value, or providing an instruction signal comprising an instruction to decelerate according to the acceptable longitudinal deceleration value in the event of the safe stop procedure.

2. The method according to claim 1, comprising:
determining the error values for the vehicle motion parameters based on vehicle motion data received from the vehicle sensors; and
calculating the limit velocity value based on maximizing a velocity value of the plurality of velocity values such that the at least one acceptable spatial deviation is not violated along the predicted near-future driving path, provided the at least one acceptable spatial deviation, longitudinal deceleration value, and the error values, or
calculating the acceptable longitudinal deceleration value based on minimizing a deceleration value of the plurality of deceleration values such that the at least one acceptable spatial deviation is not violated along the predicted near-future driving path, provided the at least one acceptable spatial deviation, a present velocity value, and the error values.

3. The method according to claim 1, wherein determining the limit velocity value or the acceptable longitudinal deceleration value comprises:
comparing a present velocity value or an acceptable longitudinal deceleration value to a dataset comprising relationships between velocity values and longitudinal deceleration values for each of the plurality of spatial deviations from the predicted near-future driving path; and
retrieving at least one of a deceleration value or a velocity value from the dataset based on the comparison such that the at least one acceptable spatial deviation is not violated along the predicted near-future driving path.

4. The method according to claim 3, further comprising:
determining the error values based on vehicle motion data received from the vehicle sensors;
calculating the plurality of spatial deviations from the near future driving path for a plurality of velocity values and deceleration values based on the vehicle motion data and the respective error values; and
generating the dataset comprising the relationships between the velocity values and longitudinal deceleration values for each of the plurality of spatial deviations.

5. The method according to claim 3, wherein the dataset is continuously updated during vehicle operation.

6. The method according to claim 1, wherein the at least one acceptable spatial deviation comprises an acceptable lateral deviation.

7. The method according to claim 1, wherein the at least one acceptable spatial deviation comprises an acceptable longitudinal deviation.

8. A system for controlling a vehicle, the system comprises:
a normal drive control unit configured to:
control propulsion and steering wheel angle during normal operation of the vehicle; and
predict a near-future driving path for the vehicle based on sensor data acquired by a set of environmental sensors; and
a safe stop control unit configured to:
control a vehicle control system for the vehicle during a safe stop operation of the vehicle;
calculate, based on error values for vehicle motion parameters, including error values for a plurality of velocity values or longitudinal deceleration values, a plurality of spatial deviations from the near-future driving path, the plurality of spatial deviations including a plurality of lateral position deviations and a plurality of longitudinal position deviations, wherein the error values are based on sensor errors of vehicle sensors that measure the vehicle motion parameters and wherein the error values take into account one or more predetermined offsets in the vehicle sensors translated into the near-future driving path to determine the plurality of lateral position deviations and longitudinal position deviations of the vehicle in an event of a safe stop procedure
retrieve at least one acceptable spatial deviation from the plurality of spatial deviations indicative of an acceptable deviation from the predicted driving path;
determine a limit velocity value or an acceptable longitudinal deceleration value based on the at least one acceptable spatial deviation, wherein the limit velocity value and the acceptable longitudinal deceleration value are determined such that the at least one acceptable spatial deviation is not violated along the near-future driving path; and
provide an instruction signal to the normal drive control unit comprising an instruction for the vehicle to travel below the limit velocity value, or provide an instruction to the vehicle control system to decelerate according to the acceptable longitudinal deceleration value in the event of the safe stop procedure.

9. The system according to claim 8, wherein the normal drive control unit is configured to provide a signal comprising the acceptable longitudinal deceleration value to the safe stop control unit.

10. The system according to claim 8, comprising:
a sensor monitoring unit configured to determine the error values in vehicle motion data received from the vehicle sensors,
wherein the safe stop control unit is configured to calculate the plurality of spatial deviations from an expected drive path for the plurality of velocity values and longitudinal deceleration values based on the vehicle motion data and the respective error values.

11. The system according to claim 8, wherein the safe stop control unit is configured to:
generate a dataset comprising relationships between velocity values and longitudinal deceleration values for each of the plurality of spatial deviations;
compare a present velocity value or the longitudinal deceleration value to the dataset; and
retrieve at least one of a deceleration value or a velocity value from the dataset based on the comparison.

12. The system according to claim 11, wherein the sensor monitoring unit is configured to continuously determine the error values in vehicle motion data during vehicle operation, wherein the safe stop control unit is configured to continuously update the dataset.

13. The system according to claim 8, wherein safe stop control unit and the normal drive control unit are isolated from each other.

14. The system according to claim 8, wherein the acceptable spatial deviation comprises one or both of an acceptable lateral deviation and an acceptable longitudinal deviation.

15. A vehicle comprising:
a normal drive control unit configured to:
control propulsion and steering wheel angle during normal operation of the vehicle; and
predict a near-future driving path for the vehicle based on sensor data acquired by a set of environmental sensors; and
a safe stop control unit configured to:
control a vehicle control system for the vehicle during a safe stop operation of the vehicle;
calculate, based on error values for vehicle motion parameters, including error values for a plurality of velocity values or longitudinal deceleration values, a plurality of spatial deviations from the near-future driving path, the plurality of spatial deviations including a plurality of lateral position deviations and a plurality of longitudinal position deviations, wherein the error values are based on sensor errors of vehicle sensors that measure the vehicle motion parameters and wherein the error values take into account one or more predetermined offsets in the vehicle sensors translated into the near-future driving path to determine the plurality of lateral position deviations and longitudinal position deviations of the vehicle in an event of a safe stop procedure
retrieve at least one acceptable spatial deviation value from the plurality of spatial deviations indicative of an acceptable deviation from the predicted driving path;
determine a limit velocity value or an acceptable longitudinal deceleration value based on the at least one acceptable spatial deviation, wherein the limit velocity value and the acceptable longitudinal deceleration value are determined such that the at least one acceptable spatial deviation is not violated along the near-future driving path; and
provide an instruction signal to the normal drive control unit comprising an instruction for the vehicle to travel below the limit velocity value, or provide an instruction to the vehicle control system to decelerate according to the acceptable longitudinal deceleration value in the event of the safe stop procedure.

16. A safe stop control unit configured to control a vehicle control system for a vehicle during a safe stop operation of the vehicle, wherein the safe stop control unit is configured to:
calculate, based on error values for vehicle motion parameters, including error values for a plurality of velocity values or longitudinal deceleration values, a plurality of spatial deviations from a predicted near-future driving path for the vehicle, the plurality of spatial deviations including a plurality of lateral position deviations and a plurality of longitudinal position deviations, wherein the error values are based on sensor errors of vehicle sensors that measure the vehicle motion parameters and wherein the error values take into account one or more predetermined offsets in the vehicle sensors translated into the predicted near-future driving path to determine the plurality of lateral position deviations and longitudinal position deviations of the vehicle in an event of a safe stop procedure
retrieve at least one acceptable spatial deviation from the plurality of spatial deviations indicative of an acceptable deviation from the predicted near-future driving path;
determine a limit velocity value or an acceptable longitudinal deceleration value based on the at least one acceptable spatial deviation, wherein the limit velocity value and the acceptable longitudinal deceleration value are determined such that the at least one acceptable spatial deviation value is not violated along the predicted near-future driving path; and
provide an instruction signal to a normal drive control unit comprising an instruction for the vehicle to travel below the limit velocity value, or provide an instruction to the vehicle control system to decelerate according to the acceptable longitudinal deceleration value in the event of the safe stop procedure.

17. A method for providing instructions for controlling a vehicle, the method comprising:
calculating, based on error values for vehicle motion parameters, including error values for a plurality of velocity values or longitudinal deceleration values, a plurality of spatial deviations from a predicted near-future driving path, the plurality of spatial deviations including a plurality of lateral position deviations and a plurality of longitudinal position deviations, wherein the error values are based on sensor errors of vehicle sensors that measure the vehicle motion parameters and wherein the error values take into account one or more predetermined offsets in the vehicle sensors translated into the predicted near-future driving path to determine the plurality of lateral position deviations and longitudinal position deviations of the vehicle in an event of a safe stop procedure;
retrieving at least one acceptable spatial deviation from the plurality of spatial deviations indicative of an acceptable deviation from the predicted near-future driving path;
determining a limit velocity value or an acceptable longitudinal deceleration value based on the at least one acceptable spatial deviation, wherein the limit velocity value and the acceptable longitudinal deceleration value are determined such that at least one acceptable spatial deviation value is not violated along the predicted near-future driving path; and
providing an instruction signal comprising an instruction for the vehicle to travel below the limit velocity value, or providing an instruction signal comprising an instruction to decelerate according to the acceptable longitudinal deceleration value in the event of the safe stop procedure.

* * * * *